United States Patent [19]

Robinson

[11] 4,097,869

[45] Jun. 27, 1978

[54] ORTHOGONAL-PORT, BICONICAL-HORN, DIRECTION-FINDER ANTENNA

[75] Inventor: Lloyd A. Robinson, Mt. View, Calif.

[73] Assignee: Stanford Research Institute, Menlo Park, Calif.

[21] Appl. No.: 777,160

[22] Filed: Mar. 14, 1977

[51] Int. Cl.² .................................... H01Q 13/00
[52] U.S. Cl. .................................. 343/773; 343/786
[58] Field of Search ............... 343/773, 774, 775, 786

[56] References Cited

U.S. PATENT DOCUMENTS

| 2,486,589 | 11/1949 | Chu | 343/775 |
|---|---|---|---|
| 2,954,558 | 9/1960 | Honey et al. | 343/786 |
| 3,906,508 | 9/1975 | Foldes | 343/786 |

Primary Examiner—Alfred E. Smith
Assistant Examiner—Harry Barlow

Attorney, Agent, or Firm—Lindenberg, Freilich, Hornbaker, Wasserman, Rosen & Fernandez

[57] ABSTRACT

An antenna comprises the combination of a biconical-horn and a circular waveguide. The major symmetry plane of the horn is horizontal and the horn describes a figure of revolution about the major axis of the circular waveguide. Coupled to the one wall of the horn with its axis perpendicular to the horizontal symmetry plane of the horn is the circular waveguide. A TEM coaxial port on the vertical axis of the horn is provided at the vertex of the cone forming the surface of the biconical-horn. Two orthogonal-ports are provided in the circular waveguide with two respective TEM transmission lines extending from within the circular waveguide outside of these ports to provide at their outputs the $TE_{11}$ modes.

9 Claims, 6 Drawing Figures

ORTHOGONAL-PORT, BICONICAL-HORN, DIRECTION-FINDER ANTENNA

BACKGROUND OF THE INVENTION

This invention relates to antennas and more particularly to improved direction-finder and transmitting antennas.

Early direction-finder antennas, at frequencies up to about 30 MHZ, made use of various combinations of fixed or rotating loops or dipoles to form FIG. 8 radiation patterns in space, plus omni-azimuthal sense patterns. A microwave antenna to form similar patterns is shown for example in a U.S. Pat. No. 2,954,558. That basic antenna uses a multiple-mode coaxial transmission line, excited by a biconical-horn. The coaxial line has four output ports whose voltages are the vector sum of all of the modes that propagate in the coaxial line. Variations on the characteristics are provided using external circuitry. While improvements over the original antenna shown in this patent have been made, all versions still retain the features of a multiple mode coaxial line and output ports that contain sums of all of the coaxial line mode voltages.

The antenna shown in the patent cited is complex in construction and complex circuitry is required. For example, the electrical orthogonality and thus direction-finder accuracy depends on taking exact sums and differences between voltages using circuits external to the waveguide. Also, rejection of unwanted waveguide modes in the waveguide output is dependent upon taking exact differences between voltages by means of circuits external to the waveguide. Reflections from circuits connected to any port couples error voltages into other ports. Finally, the bandwidth of the waveguide is limited by phase dispersion between waveguide modes and a TEM mode.

OBJECTS AND SUMMARY OF THE INVENTION

An object of this invention is to provide an antenna of the type indicated, wherein bandwidth is not limited by phase dispersion between the waveguide modes and the TEM mode.

Another object of the present invention is to provide an antenna wherein its three ports are electrically orthogonal, whereby they are decoupled from one another and reflections from circuits connected to any port does not couple into the other ports.

Still another object of the present invention is to provide an antenna wherein rejection of unwanted waveguide modes is determined by the physical construction of the antenna rather than by taking exact differences between voltages by means of circuits external to te waveguide.

Yet another object of this invention is the provision of an antenna which is less complex and has less external circuits than is required by presently known antennas.

The foregoing and other objects of te invention may be achieved in an arrangement wherein a biconcial-horn, which describes a figure of revolution about a vertical axis is combined wth a circular waveguide, whose axis is the same as the vertical axis. The circular waveguide walls are joined to one of the walls of the biconical-horn. The opposite end of the circular waveguide forms a shorted waveguide stub. At the top of the antenna on the axis of revolution of the horn, is a coaxial port with a stub therein. In the waveguide, near the end thereof is provided two orthogonal-ports each having small TEM transmission lines extending therein to obtain $\sin\theta$ and $\cos\theta$ outputs from the circular waveguide.

For determining directionality, the phase of the omniazimuthal TEM port signal obtained from the top of the antenna is compared with the $\sin\theta$ and $\cos\theta$ outputs derived from the two output ports in the waveguide, to resolve a 180° azimuth ambiguity that can result if only the magnitudes of the $\sin\theta$ and $\cos\theta$ ports are used to calculate the direction of arrival. When used as a transmitting antenna, each of the three antenna ports is associated with a beam in space, one omni and two figure 8's. Combining circuitry can be provided to excit all three ports to steer a cardioid beam in any azimuth direction. The beam width in the elevation plane and the gain are readily controlled by the height of the antenna aperture.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
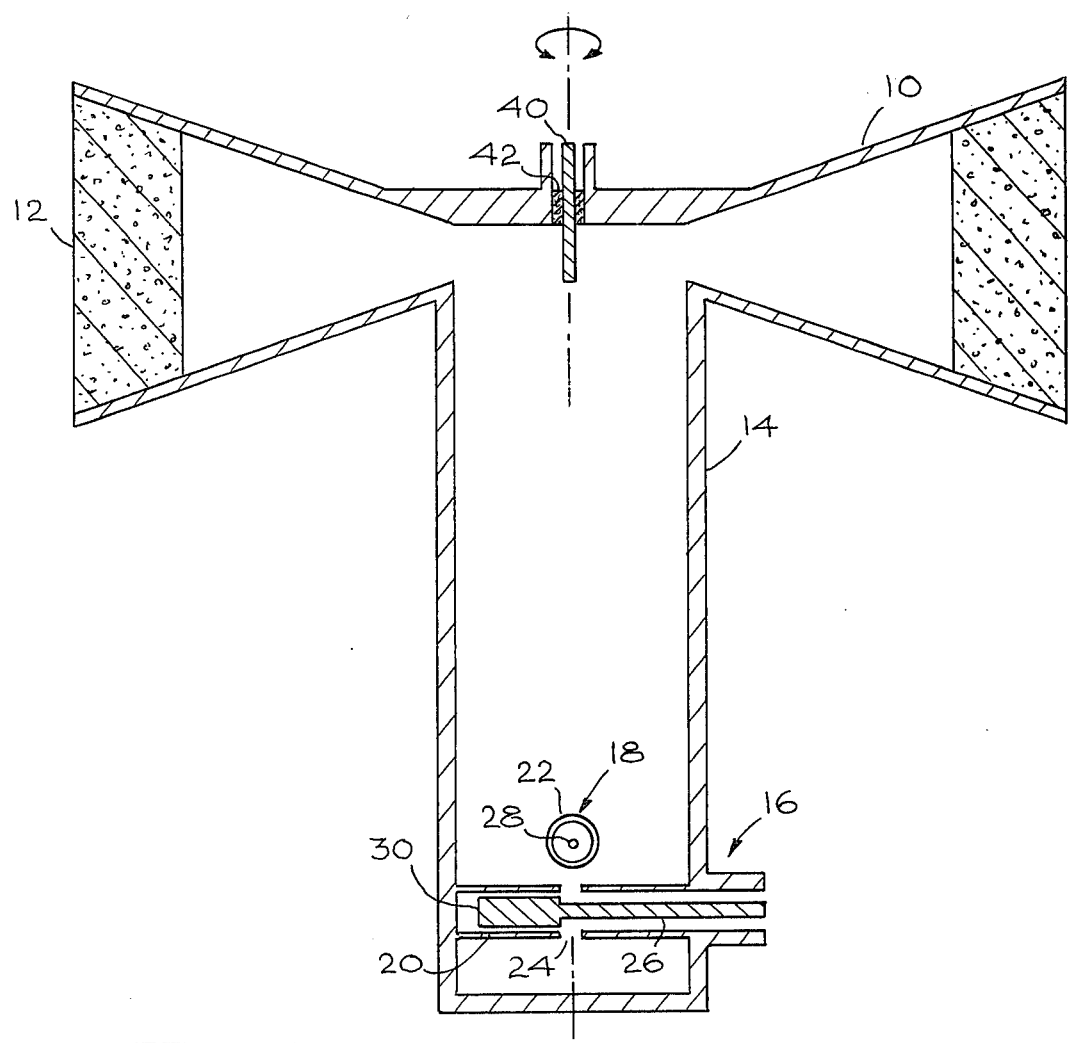
FIG. 1 is a vertical cross section of an embodiment of this invention.

Referring to FIG. 1, there may be seen a vertical cross section of an antenna in accordance with this invention. It comprises a radiating element, which is a figure of revolution about the vertical axis. This constitutes biconical-horn 10. The angles of the top and bottom cones of the biconical-horn, with respect to the horizontal plane, need not be equal. A foam ring 12 serves both to seal the entrance to the horn to dirt, and also to assist in the support of the top cone of the horn.

Centered on the same axis as the biconcial-horn is a circular waveguide 14. The wall of the circular waveguide merges with the lower cone of the biconical-horn. The bottom of the circular waveguide comprises a shorted waveguide stub.

Signals are coupled out of the base of the circular waveguide by two ports respectively 16 and 18 which are orthogonally arranged relative to one another. The signals derived from these two ports have amplitudes proportional to $\sin\theta$ and $\cos\theta$ where $\theta$ in the azimuth bearing of the received signal. Hollow conductors 20 and 22 extend from each port across a diameter of the waveguide. These conductors are the ground conductors of a small TEM transmission line which is either coaxial or microstrip or stripline. Each conductor has a feed gap 24 (only one of which is shown) at its center which couples current to the inside of the small transmission line and thereby to the outer port. If the TEM transmission lines are coaxial, port 18 is slightly above or below port 16.

A central conductor, respectively 26, 28 supported by a suitable dielectric, is provided for each hollow conductor and completes the TEM transmission line. Each of these inner conductors has a low impedance stub portion 30, (only one of which is shown), which has a larger diameter than the remainder of the inner conductor. This stub section is used for tuning and also may be considered as a quarter-wave-length, open circuited stub which is used to compensate for the reactance of the short circuited stub that is formed by closing the circular waveguide below the output ports. If desired, and preferably, a matching network may be placed at the end of the open-circuited stub to provide a low VSWR over the full operating frequency band.

Also centered on the biconical axis of the antenna and mounted on the top cone, is a dipole probe 40, that is supported by insulating dielectric 42, in an axial opening in the antenna. This probe provides an omni-azimuthal radiation pattern and is the TEM port of the antenna. This port provides a phase reference to resolve whether the $\sin\theta$ and $\cos\theta$ signals should be treated with positive or negative polarities in calculating the direction of arrival of the signals.

Accordingly, the arrangement illustrated in FIG. 1 provides the ports for the antenna, that are orthogonal in both the geometric and the electrical senses.

In operation, the phase of the omni-azimuthal TEM port signal will be compared with that of the $\sin\theta$ and $\cos\theta$ outputs to resolve a 180° azimuth ambiguity that may result if only the magnitudes of the $\sin\theta$ and $\cos\theta$ ports are used to calculate direction of arrival.

Figure 2A:
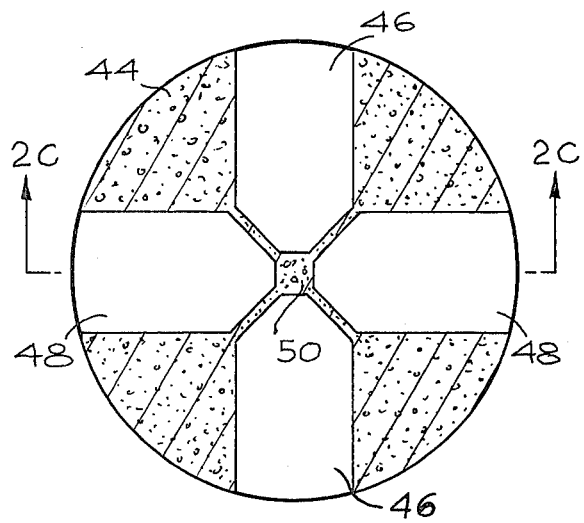
FIGS. 2A and 2B are top and bottom views illustrating microstrip construction of the coupling ports and FIG. 2C is a sectional view along the lines 2C—2C of FIGS. 2A and 2B.
Figure 2B:
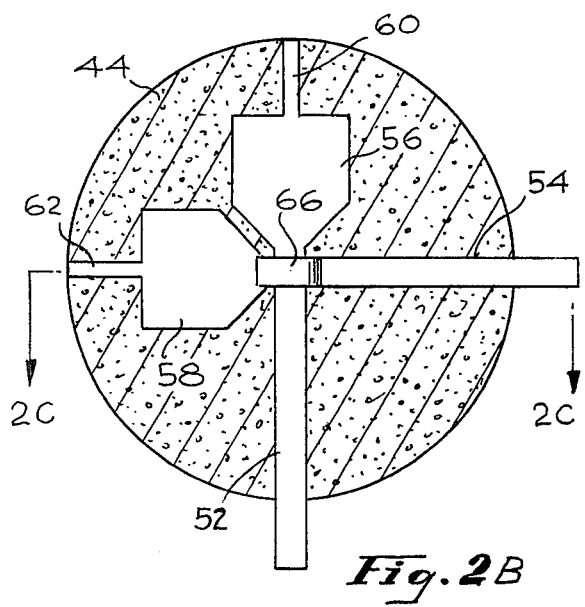
Figure 2C:
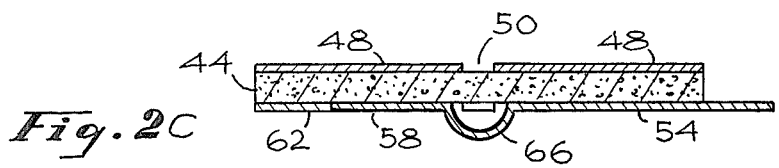

An embodiment of the orthogonal coupling ports realized using microstrip instead of coaxial TEM transmission lines for deriving outputs is illustrated in FIGS. 2A, 2B and 2C. The microstrip conductors are supported by an insulating dielectric 44. Two orthogonal pairs of conductors 46 and 48 extend across diameters of circular waveguide 14, and are connected to the wall of the circular waveguide. The received signal, in the form of a $TE_{11}$ mode in the circular waveguide, induces radial currents in conductors 46 and 48. When these currents reach the feed-gap region 50, they flow onto the under sides of conductors 46 and 48 and excite the quasi-TEM microstrip mode on center conductors 52 and 54.

Center conductors 52 and 54 carry the $\sin\theta$ and $\cos\theta$ signals to the external direction determining circuits by some means, such as the tabs shown projecting beyond the support dielectric 44. These tabs would pass through small holes in the circular waveguide wall 14. Broad-band tuning is provided by the low-impedance, open circuited stubs 56 and 58, or by more elaborate circuitry if warranted. The next level of sophistication is illustrated by the addition of the high-impedance shorted stubs 60 and 62. The microstrip coupling structure of FIGS. 2A, 2B is of planar geometry except for a crossover 66 of one center conductor over the other. This non-planar feature could be eliminated by printing conductors 46 and 52 and 56 on the sides of dielectric 44 as shown in the drawing, and printing conductors 48, 54 and 58 on the opposite sides of dielectric 44.

Figure 3:
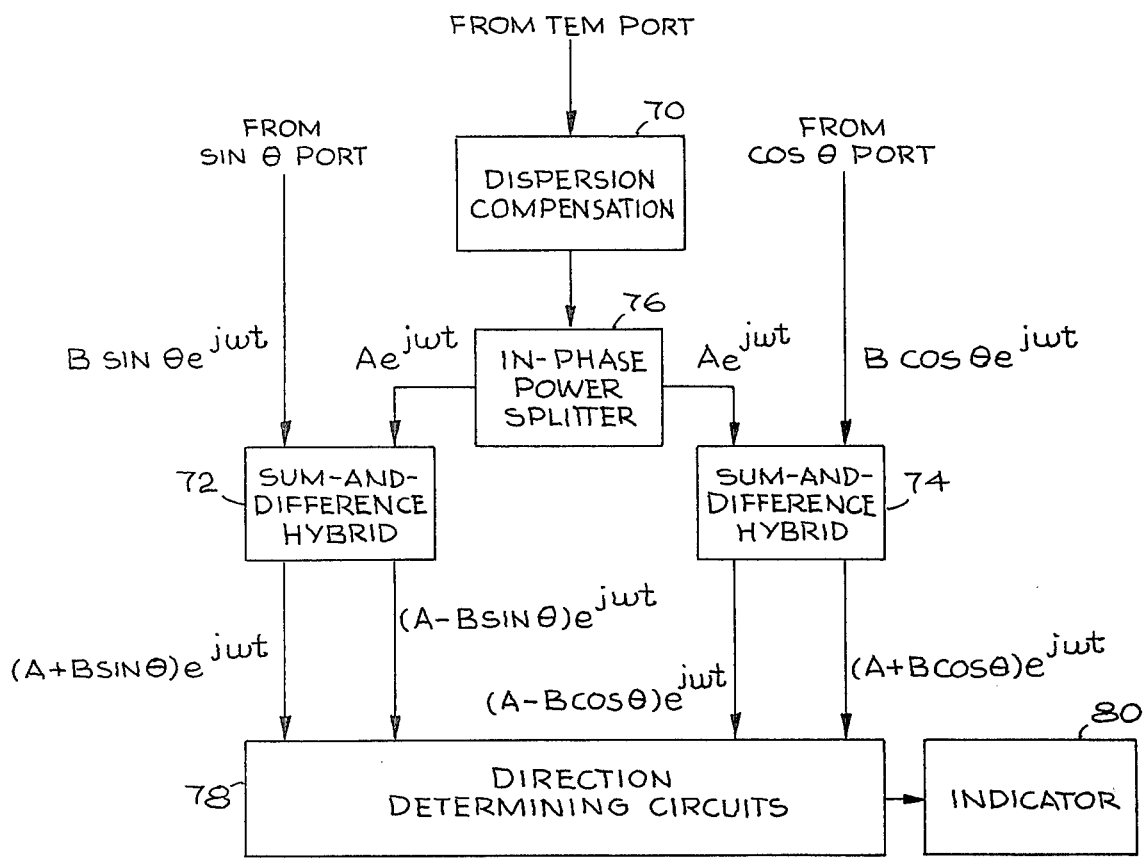
FIG. 3 is a block schematic diagram illustrating circuitry which is used with the embodiment of this invention for determining directionality.

Referring now to FIG. 3, there may be seen a block schematic diagram of an RF network that enables the comparison of the phases of the signal outputs from the three ports of the antenna. The output from the TEM port, from which the stub 40 extends, is passed through a dispersion-compensation network 70 which corrects for the fact that the $TE_{11}$ waveguide mode propagates with a wavelength that is different than the free-space wavelength. The network also corrects for differences in physical path length from the aperture of the biconical-horn to the omni output, and to the $\sin\theta$ and $\cos\theta$ outputs. This dispersion-compensation network can be realized using either coupled TEM lines, or a reactive network on one port of a circulator, or a length of waveguide. Suitable dispersion compensation networks are known and described for example in an article by E. G. Cristal entitled "Theory and Design of Transmission Line All-Pass Equalizers," found in *IEEE Transactions on Microwave Theory and Techniques*, Vol. MTT-17, No. 1, pages 28–38 (January, 1969). As indicated previously, the dominant circular waveguide mode is the $TE_{11}$ mode, and the two small TEM transmission lines oriented at 90° from each other resolve the $TE_{11}$ modes of the circular waveguide into spatially and electrically orthogonal components.

The port 16, which may be assumed as a $\sin\theta$ port is applied as an input to a sum and difference hybrid network 72. This input may be designated as $B\sin\theta e^{j\omega t}$.

Another sum and difference hybrid 74, receives as one input the output from the other port designated as the $\cos\theta$ port. This input to the sum and difference hybrid is designated as $B\cos\theta e^{j\omega t}$. A second input to each one of the sum and difference hybrids is the output of an in-phase power splitter 76. The input to this power splitter is the output of the dispersion compensation network. The output of the power splitter comprises $Ae^{j\omega t}$.

Accordingly, the output of the sum-and-difference hybrid 72 comprises the terms $(A+B\sin\theta)e^{j\omega t}$ and $(A-\lambda B\sin\theta)e^{j\omega t}$. The output of the hybrid 74 comprises $(A-B\cos\theta)e^{j\omega t}$ and $(A+B\cos\theta)e^{j\omega t}$. All of these signals are applied to well known direction determining circuits 78, which combine these signals to provide an output indicative of the direction from which the antenna receives signals. This output is applied to an indicator 80, which provides a visual indication of the direction of the received signal.

Alternative to the foregoing arrangement, each of the three antenna ports can feed one of a set of three matched mixers and IF amplifiers, and the phase comparison can be done at IF instead of RF. An arrangement as indicated to do the comparison at IF is well known to those skilled in this art and therefore will not be described here.

The ultimate bandwidth of this DF antenna is determined by higher-order modes that will propagate in the circular waveguide at the upper frequencies, as the bandwidth is increased. At 1.31 times the cutoff of the $TE_{11}$ mode, the $TM_{01}$ mode will begin to propagate. The fields of the $TM_{01}$ mode, however, are such that they will not couple to the centered gap of the $\sin\theta$ and $\cos\theta$ output ports, so this mode is unimportant. The $TE_{21}$ mode will start to propagate at 1.66 times the $TE_{11}$ cutoff, but again, the $\sin\theta$ and $\cos\theta$ ports do not couple to this mode by symmetry of the construction. The $TE_{01}$ and the $TM_{11}$ mode start to propagate at 2.08 times the $TE_{11}$ cutoff, but the $TE_{01}$ mode would not couple to either the biconical-horn or the $\sin\theta$ and $\cos\theta$ output ports. The $TM_{11}$ mode will only be weakly excited by the biconical-horn, if at all. If it is excited, it can be attenuated by small-diameter resistive rods parallel to the waveguide axis, which will not introduce significant loss to the desired $TE_{11}$ mode. The $TE_{31}$ mode will start to propagate at 2.38 times the $TE_{11}$ cutoff, and this mode will couple to the $\sin\theta$ and $\cos\theta$ ports and cause direction finding errors. Thus, the $TE_{31}$ mode limits this antenna to about an octave bandwidth. (The $TE_{31}$ produced errors are systematic and may be corrected by a system that stores the errors in a computer and measuring frequency as well as direction). At frequencies just below the $TE_{31}$ cutoff, the evanescent fields of this mode extend a finite distance below the top of the waveguide. Thus, the waveguide from the throat of the biconical-horn, to the $\sin\theta$ and $\cos\theta$ output ports is made long enough that the $TE_{31}$ components are attenuated to a negligible value even at the upper operating frequency.

Figure 4:
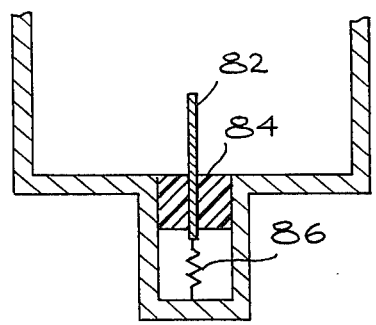
FIG. 4 is a cross sectional view of a resistively loaded axial prove which may be used in the invention to suppress the $TM_{01}$ mode.

The dipole probe that is part of the omni-azimuthal port does not couple to the $TE_{11}$, $TE_{21}$ or $TE_{31}$ circular waveguide modes. It does however, couple to the $TM_{01}$ circular waveguide mode. If this proves to be a problem, the field configurations for the $TM_{01}$ and $TE_{11}$, modes are sufficiently different that mode filtering can be applied. For example, the $TM_{01}$ mode may be damped out by means of a lossy filament along the waveguide axis, or by means of a probe at the base of the waveguide. The arrangement for this is shown in FIG. 4. A dipole probe 82 is supported by a dielectric material 84 at the base of the waveguide 14 and extends along its axis. A lossy filament 86 serves as a load and extends to the base of the waveguide wall. This technique does not introduce significant dissipation loss for the $\sin\theta$ and $\cos\theta$ output ports. Further, the probe in FIG. 4 may also serve as a second omni port at frequencies above the $TM_{01}$ cutoff.

An essential feature of the bicponcial-horn, or other radiator which may be used in its place, is that the vertical spacing between the top and bottom surfaces be less than $\lambda/2$ in the throat region where the radiator joins the waveguide, where $\lambda$ is the wavelength in the medium filling the radiator. This is to ensure that only one polarization component of the field excited within the radiator structure couples to the waveguide, the vertical component for the geometry of FIG. 1. Horizontal septa (similar to washers) may be inserted in the throat region of the biconical-horn to increase the rejection of the wrong polarization component. If the wrong polarization component was allowed to reach the waveguide, its indicated direction of arrival would be in error by 90°. If the complete antenna is to have polarization properties other than vertical polarization, a polarization converter (polarizer) can be added to the aperture region of the biconical-horn, or other radiator.

There has accordingly been described above a novel and useful direction finder antenna which has a wide bandwidth which is less complex than other antennas performing the same function and which requires less circuitry and simpler circuitry than other antennas providing the same function.

I claim:

1. A direction finder antenna comprising:
    a circular waveguide having one end closed and the other end open, a radiating element comprising a figure of revolution about the axis of said circular waveguide, said radiating element having one wall joined with the open end of the circular waveguide,
    an axial opening extending through the wall of the radiating element which is opposite to the wall which joins the circular waveguide wall,
    a dipole probe extending through the opening in said wall along the axis of a said circular waveguide,
    orthogonally disposed ports in the wall of said circular waveguide positioned at a predetermined location from the closed end thereof, and
    means at each of said ports for deriving electrical outputs from said direction finder antenna.

2. A direction finder antenna as recited in claim 1 wherein said means at each of said ports for deriving electrical outputs from said direction finder antenna comprises microstrip means including:
    a circular dielectric body having on one side two orthogonal pairs of conductors extending across diameters of said circular dielectric body and contacting said circular waveguide walls,
    a feed through hole at the center of said circular dielectric body, and
    a pair of orthogonally related output conductors extending along diameters of the other side of said insulating body.

3. A direction finder antenna as recited in claim 1 wherein said means at each of said ports for deriving electrical outputs from said direction finder antenna comprises a transmission line extending from each port along a diameter of said circular waveguide into said circular waveguide.

4. A direction finder antenna as recited in claim 1 wherein said radiating element which is a figure of revolution comprises a biconical-horn.

5. A circular waveguide as recited in clain 3 wherein each said transmission line comprises a hollow circular conductor extending across said circular waveguide along a diameter thereof, an inner conductor insulatedly supported within each of said hollow conductors, and
    an opening in each of said hollow conductors at the axis of said circular waveguide.

6. A circular waveguide as recited in claim 1 which includes a dipole probe insulatingly supported at the closed end of said circular waveguide and extending along the axis thereof, and
    a lossy load connected between one end of said dipole probe and the wall of said circular waveguide.

7. A direction finder antenna comprising a circular waveguide having one end shorted and the other end open, a biconical-horn having one wall connecting with the wall of the circular waveguide at its open end, said biconical-horn comprising a figure of revolution about the axis of said circular waveguide,
    an opening through the wall of said biconical-horn which is opposite to the wall connected to the waveguide, said opening extending along the waveguide axis,
    a dipole probe insulatingly supported in said opening and extending along the circular waveguide axis,
    first and second openings in said circular waveguide walls, said first and second openings being orthogonally disposed relative to one another and being positioned at a predetermined location relative to the end of said waveguide, and
    first and second means for deriving outputs from said circular transmission line, extending into said circular waveguide through said first and second openings.

8. A direction finder antenna as recited in claim 7 wherein said first and second means respectively comprise transmission line means.

9. A direction finder antenna as recited in claim 7 wherein said first and second means respectively comprise microstrip means.

* * * * *